United States Patent [19]

Stein

[11] 4,211,424
[45] Jul. 8, 1980

[54] CENTRIFUGALLY COMPENSATED SEAL FOR SEALING BETWEEN CONCENTRIC SHAFTS

[76] Inventor: Philip C. Stein, c/o Stein Seal Company, 20th St. & Indiana Ave., Philadelphia, Pa. 19132

[21] Appl. No.: 30,212

[22] Filed: Apr. 16, 1979

[51] Int. Cl.² .............................................. F16J 15/42
[52] U.S. Cl. ..................................................... 277/25
[58] Field of Search ............................ 277/25, 83, 134

[56] References Cited

U.S. PATENT DOCUMENTS

| | | | |
|---|---|---|---|
| 2,919,938 | 1/1960 | Rose | 277/25 |
| 2,943,463 | 7/1960 | Shipley | 277/25 |
| 3,443,815 | 5/1969 | Voitik et al. | 277/83 |
| 3,492,008 | 1/1970 | Donley | 277/83 |
| 3,493,235 | 2/1970 | Dautz et al. | 277/75 |

*Primary Examiner*—Robert I. Smith
*Attorney, Agent, or Firm*—Harding, Earley & Follmer

[57] ABSTRACT

A seal for sealing between a hollow outer shaft and an inner shaft concentric with the outer shaft has a seal ring with a plurality of segments extending around the inner shaft. The seal ring has an outer circumferential face confronting the inner surface of the outer shaft, a first side face exposed to a region of high pressure and a second side face confronting a mating ring secured to the inner shaft and having a portion thereof exposed to a region of lower pressure. A segmented compensating ring extends around the inner shaft and spaced from the seal ring in the region of high pressure. A flange secured to the inner shaft limits the axial movement of the compensating ring away from the seal ring. A continuous balancing ring between the seal ring and the compensating ring has a pair of conical faces mating with conical faces on the seal ring and compensating ring, respectively. Advantageously, hydrodynamic and closed pockets in the bearing surfaces are used to vary the contact forces.

12 Claims, 13 Drawing Figures

CENTRIFUGALLY COMPENSATED SEAL FOR SEALING BETWEEN CONCENTRIC SHAFTS

TECHNICAL FIELD

This invention is in the field of fluid seals.

BACKGROUND OF THE PRIOR ART

Sealing between coaxial shafts rotating at high and differing speeds has long been a serious problem. A case in point pertains to multi-shaft aircraft turbine engines wherein the shaft carrying the low pressure compressor and the low pressure turbine is coaxial with and inside the tubular shaft carrying the high pressure compressor and the high pressure turbine. The shafts may be corotating or counterrotating and the mean diameter of the annulus between them can be of the order of two inches to eight inches. Shaft speeds of 10,000 to 20,000 RPM are common.

Figure 1:
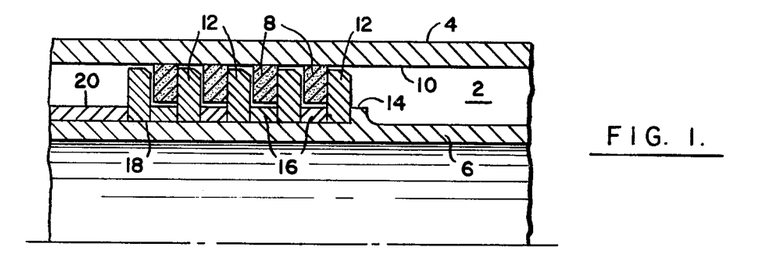
FIG. 1 is a sectional view partially broken away of a prior art carbon ring seal.

Typically, sealing this annulus has involved use of ring type carbon seals with gaps so that centrifugal force could dilate the rings and cause them to seat tightly against the bore of the outer shaft. Such a seal is shown in FIG. 1 where the annulus 2 between an outer shaft 4 and an inner shaft 6 is sealed by a plurality of segmented carbon seal rings 8 each of which is adapted to bear against the inner surface 10 of outer shaft 4 and against a mating ring 12 secured to inner shaft 6 by virtue of shoulder 14, spacing rings 16, annular ring 18 and sleeve clamp 20.

The principal problem presented by this type of seal stems from the magnitude of the centrifugal force on the ring. For example, if a carbon seal ring of 5 inch mean diameter and of ¼ inch by ¼ inch cross-section should rotate at 12,000 RPM the radial loading could be calculated as follows:

The weight of the carbon ring, using a specific weight of 0.065 lb per cubic inch would be about 0.004 lb per inch of circumference.

The centrifugal field would be equivalent to:

$$G = \frac{rw^2}{g} = \frac{2.5 \times (12,000 \times 2\pi \div 60)^2}{386} = 10,227 \text{ gravities.}$$

Thus the loading on the ring would be: 0.004 lb/inch × 10,227 = 40.9 lb/inch.

Therefore, the ring would be practically fixed by the centrifugal force in the bore and would require a force equivalent to 8 or 10 lb per inch to move it axially. Since the shafts would have different rotational speeds, even if corotational, the ring would need to rub either on its outer arcuate surface or on its transverse face. Obviously, the loadings on both these surfaces are too high for desirable wear life.

The present invention partially relieves the high centrifugal loading due to the rotation of the seal ring. The invention also can cause the seal ring to rotate at a speed intermediate the speed of the two shafts, thus reducing the maximum rubbing velocity. The invention relieves the centrifugal loading with relatively simple means without resorting to a multiplicity of hinged or articulated counterweights or similar complex mechanisms. The loadings at the rubbing surfaces are markedly reduced.

The use of hydrodynamic pockets to produce negative and positive lift in shaft seals is known to the art as is seen in U.S. Pat. No. 4,082,296, the disclosure of which is incorporated herein by reference. As pointed out in said patent, positive lift provided by hydrodynamic pockets has been used to reduce rubbing loads in seals associated with single shafts. In accordance with this invention pressure developed in hydrodynamic pockets cooperating with one shaft is communicated to closed pockets cooperating with the other shaft to control relative rotation speeds of the seal ring and the shafts.

BRIEF SUMMARY OF THE INVENTION

A seal for sealing between a hollow outer shaft and an inner shaft concentric with the outer shaft has a seal ring with a plurality of segments extending around the inner shaft. The seal ring has an outer circumferential face confronting the inner surface of the outer shaft, a first side face exposed to a first region containing a fluid under pressure and a second side face confronting a mating ring secured to the inner shaft and having a portion thereof exposed to a second region of lower pressure. A segmented compensating ring extends around the inner shaft and is spaced from the seal ring in the first region. A flange secured to the inner shaft limits the axial movement of the compensating ring away from the seal ring. A continuous balancing ring between the seal ring and the compensating ring has a pair of conical faces mating with conical faces on the seal ring and the compensating ring, respectively. Advantageously, hydrodynamic pockets in communication with closed pockets in the various bearing surfaces when there is relative movement between them are used to vary the contact forces in order to reduce rubbing velocities.

DETAILED DESCRIPTION OF THE INVENTION

Figure 2:
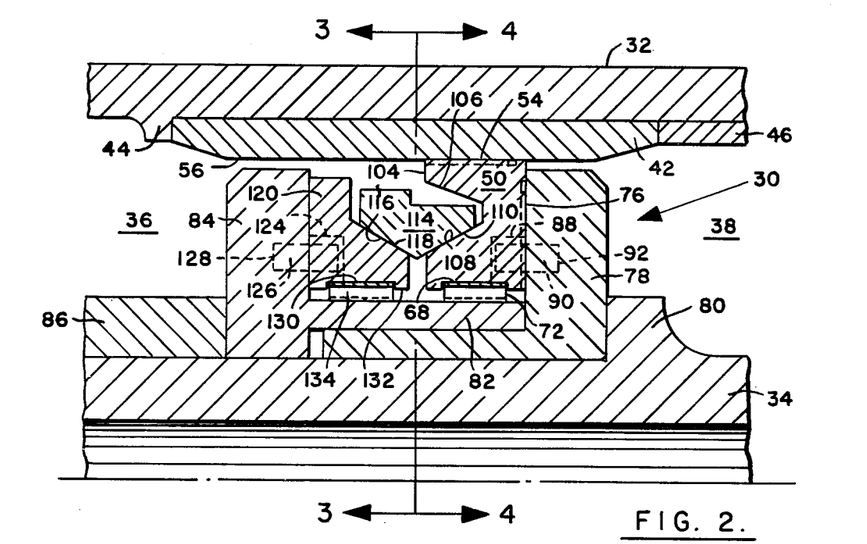
FIG. 2 is a sectional view, partially broken away, of a seal in accordance with the invention.
Figure 3:
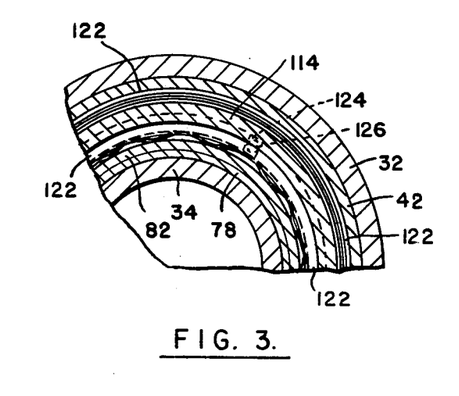
FIG. 3 is a vertical section, partially broken away, taken on the plane indicated by the lines 3—3 in FIG. 2.
Figure 4:
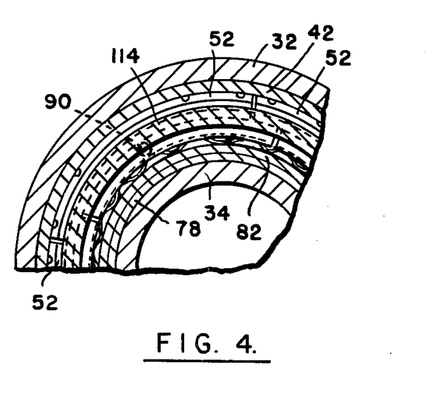
FIG. 4 is a vertical section, partially broken away, taken on the plane indicated by the lines 4—4 in FIG. 2.

Referring to FIG. 2, a seal 30 seals between an outer shaft 32 and an inner shaft 34. Shafts 32 and 34 may be corotated or counterrotated. The seal 30 acts to seal a pressure region annulus 36 containing a fluid under pressure, for example air, from a lower pressure region annulus 38.

Figure 5:
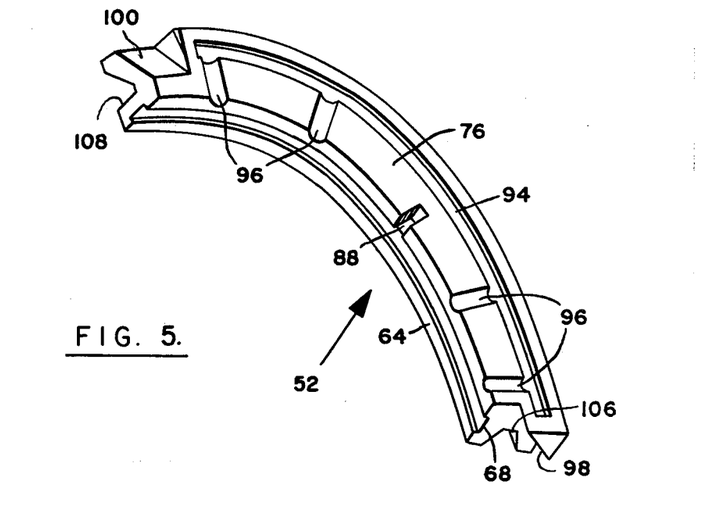
FIG. 5 is a bottom perspective view of one of the segments forming the seal ring shown in FIG. 2.
Figure 6:
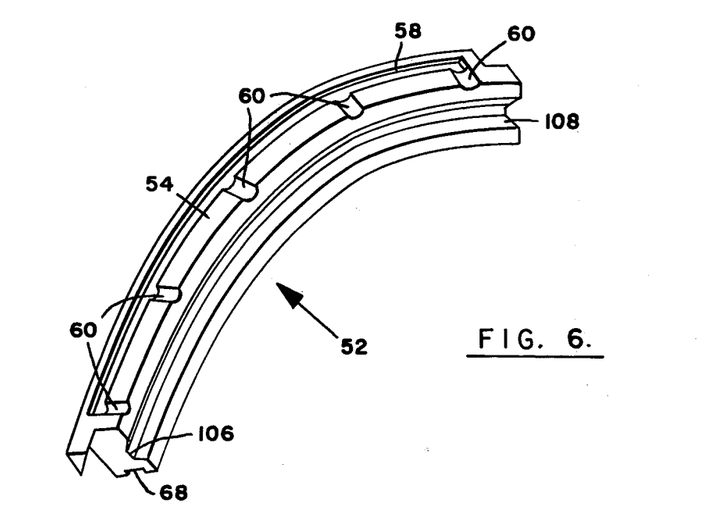
FIG. 6 is a top perspective view of the seal ring segment of FIG. 5.
Figures 10, 11:
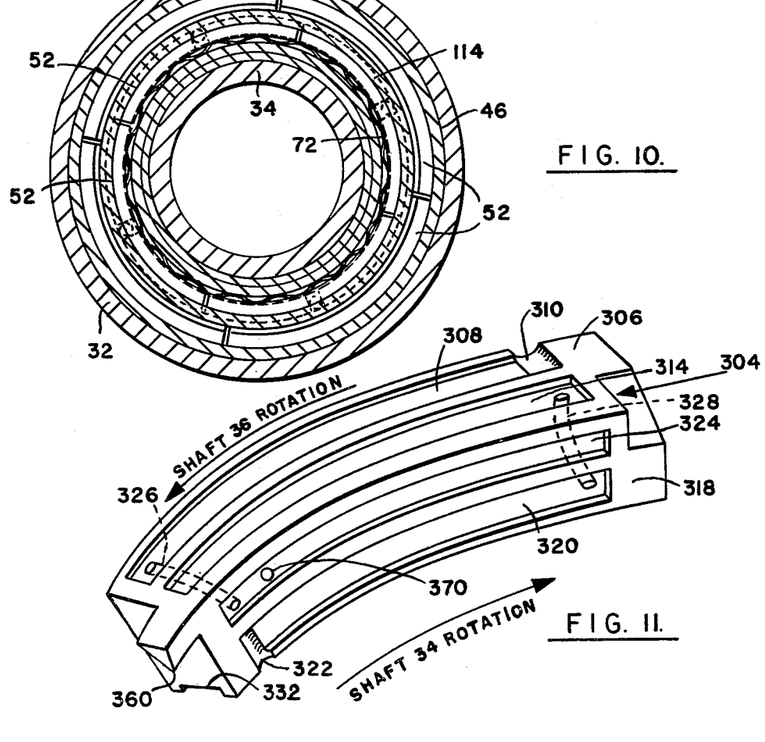
FIG. 10 is a vertical section through the seal of FIG. 2.
FIG. 11 is a top perspective view of one of the seal ring segments used in the seal of FIG. 9.
Figure 12:
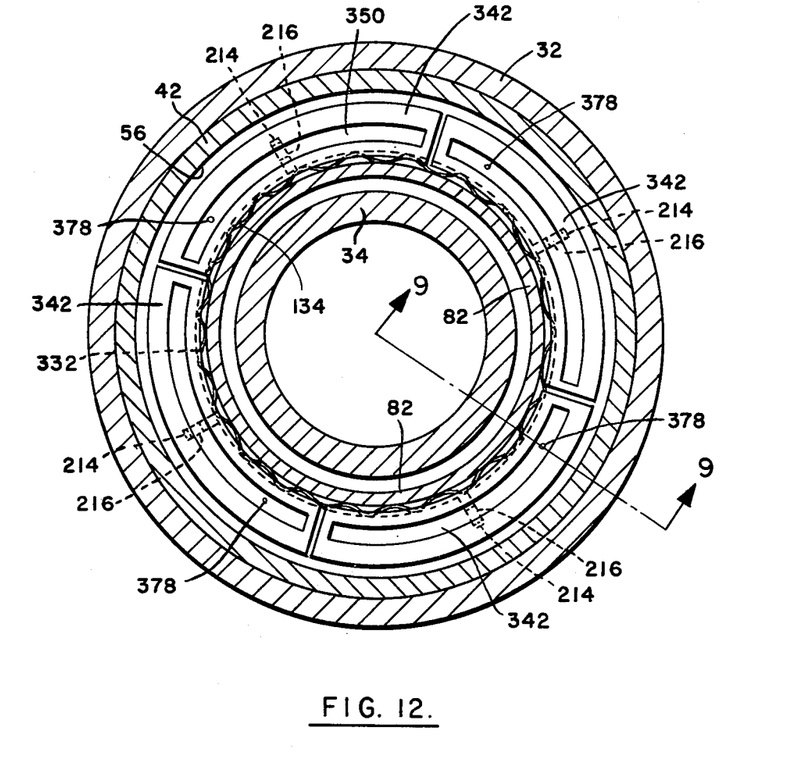
FIG. 12 is a vertical section taken on the plane indicated by the line 12—12 in FIG. 9.

Outer shaft 32 has an inner sleeve 42 secured against a shoulder 44 by clamp ring 46 and is adapted to be engaged by a segmented seal ring 50. As best seen in FIG. 6, each segment 52 of seal ring 50 has an outer circumferential face 54 adapted to bear against the inner surface 56 of sleeve 42 (FIG. 2). Face 54 has a pressure relieving groove 58 supplied with fluid under pressure through grooves 60 which are in communication with pressure region 36. The inner peripheral face 64 of each segment 52 has a recess 68 (FIG. 5) which receives a wavy spring metal strip 72 (FIGS. 2 and 10) which urges face 54 into contact with sleeve 42 and face 76 into contact with mating ring 78 when shaft 34 is not rotating or is rotating at a very low speed as will be seen more fully later.

Each seal ring segment 52 has a side face 76 (FIG. 5) confronting a mating ring 78 (FIG. 2) secured to inner shaft 34 by a shoulder 80, annular portion 82 of flange 84, and clamping ring 86. Face 76 has a slot 83 which receives a pin 90 secured in openings 92 in mating ring 78 to cause the rotation of the segment with ring 78 while still permitting the segment to move towards and away from sleeve 42 and mating ring 78. Face 76 is provided with a pressure relieving groove 94 (FIG. 5) communicating with pressure region 36 through grooves 96. Each segment has a diagonal face portion 98 which mates with a diagonally cut groove 100 in the adjacent segment to provide for a sliding joint between segments and a continuous seal against mating ring 78 and sleeve 42 in the manner conventionally employed with seal rings.

In side face 104 opposite face 76 of each seal ring segment 52 is a groove 106 (FIGS. 2 and 6) with a conical face 108 which mates with a conical face 110 of a continuous balancing ring 114 (FIG. 2). Balancing ring 114 has a conical face 116 which mates with a conical face 118 on a segmented compensating ring 120 (FIG. 2). Each segment 122 of ring 120 abuts against flange 84 and has a slot 124 receiving a pin 126 secured in opening 128 of flange 84 to cause the segments 122 to rotate with flange 184 while being free to move towards and away from ring 114 and towards and away from sleeve 42. As in the case of the segments 52, segments 122 each have a recess 130 on inner peripheral face 132 (FIG. 2) receiving a wavy spring metal strip 134 which bears against flange portion 82 and urges each segment 122 against face 116 of balancing ring 114 and hence also towards flange 84. Segments 122 are closely spaced.

The segments 50 and 122 may be made of any material conventionally used for rubbing seals, for example, carbon. All the other parts may be made of a suitable metal, for example, steel. The pressure compensating grooves 56 and 94 are not required, but are advantageously employed when the pressure difference between regions 36 and 38 is large.

Generally it is advantageous to have the cone angles of faces 110 and 116 and consequently of faces 108 and 114 equal. Under these conditions, the mass of the compensating ring 120 is selected to be slightly less than the mass of the seal ring 50.

OPERATION

Assuming shafts 32 and 34 to be corotating with outer shaft 32 rotating at 16,000 RPM and inner shaft 34 rotating at 12,000 RPM, centrifugal force causes seal ring 50 to bear against surface 56 of sleeve 42 with a force which is lessened somewhat by pressure compensating groove 58. In addition, since the faces 108 of segments 52 are bearing against face 110 of balancing ring 114, centrifugal force causes segment side faces 76 to bear against mating ring 78 with a force lessened by the effect of pressure relieving groove 94. Simultaneously, centrifugal forces urges compensating ring 84 outwardly away from shaft 34 urging faces 118 against face 116 of balancing ring 114. Since flange 84 prevents the ring 120 from moving to the left as seen in FIG. 2, this urges the balancing ring 114 into groove 106 of each segment 52 of the seal ring 50 causing face 110 to urge each face 108 inwardly towards shaft 34 creating a centripetal force compensating for a predetermined part of the centrifugal load on the seal ring. The relative masses of the seal ring and the compensating ring and the cone angles of the mating faces will be selected depending upon the centripetal force desired. When the cone angles are made substantially greater than the friction angle (that is arc tangent of coefficient of friction) the compensation can equal a major fraction of the centrifugal effect.

SECOND EMBODIMENT

When it is desired to have shafts 32 and 34 counterrotating at relatively high speeds, for example, over 10,000 RPM, it is preferable not to lock the seal ring 50 and compensating ring 120 so that they rotate with the inner shaft. For example, with the outer shaft 32 and the inner shaft 34 corotating at speeds of 16,000 RPM and 12,000 RPM respectively with the seal ring turning with the inner shaft 34, as shown in FIG. 2, the relative rubbing velocity between the seal ring 50 and the outer shaft 32 would be 104.7 feet per second. However, if the shafts are counterrotating at the same speeds, the relative rubbing velocity would be 733 feet per second which desirably is reduced. To this end, the embodiment of FIG. 2 may be modified as shown in FIG. 7.

Figure 7:
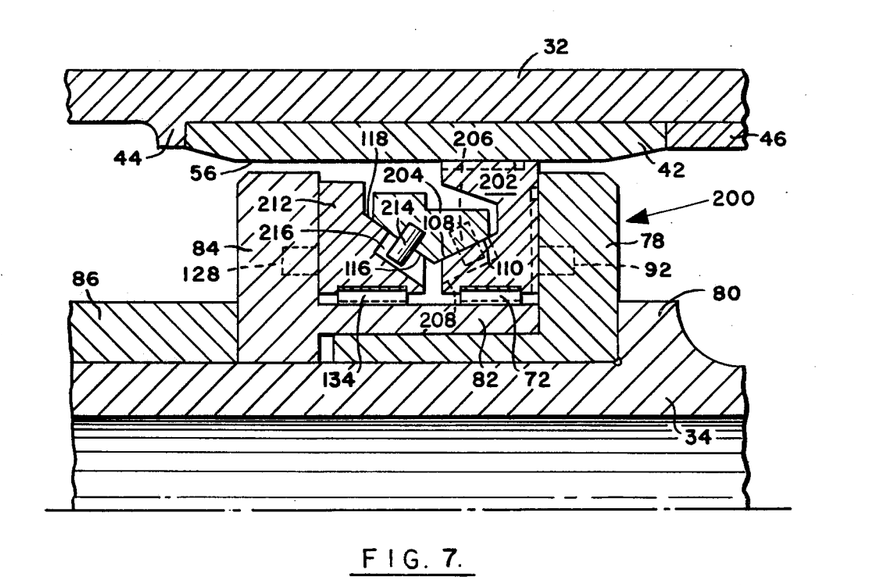
FIG. 7 is a vertical section, partially broken away, showing an alternative seal in accordance with the invention.

Referring to FIG. 7, all pins 90 and 126 have been removed from mating ring 78 and flange 84, respectively. The seal 200 shown in FIG. 7 is in most respects the same as the seal 30 of FIG. 2 and hence where there is identity, identical numbers are used to identify the parts. Pins 90 and 126 have been eliminated. Seal ring segments 202 and balancing ring 204 are the same as seal ring segments 52 and balancing ring 114, respectively, with the exception that they are connected for rotation together rather than having the seal ring segments connected to mating ring 78. Each seal ring segment 202 is connected for rotation with continuous balancing ring 204 by means of a pin 206 secured to ring 204 and engaged in a slot 208 in segment 202. Further, the balancing ring segments 212 are the same as compensating ring segments 122 with the exception that they are connected to balancing ring 204 for rotation therewith. Each balancing ring segment 212 is connected for rotation with ring 204 by a pin 214 secured to ring 204 and carried in a slot 216 in segment 212. In all other respects, seal ring segments 202, balancing ring 204 and compensating ring segment 212 are identical with seal ring segments 52, balancing ring 114 and compensating ring segments 122 of the embodiment shown in FIG. 2.

For use in the embodiment of FIG. 7, springs 72 and 134 are designed so that centrifugal force will cause them to lose contact with flange portion 82 when the assembly of segments 202, 212 and ring 204 reach a moderate rotating speed to reduce wear. For example, if the diameter of the spring is approximately 5 inches and the wavy spring has 8 cycles around the circumference, the cycle length would be 1.96 inches. If the spring is 0.005 inch thick and 0.200 inch wide and it is installed with a deflection of 0.03 inch at each high point, the loading would be 0.057 lb. at each high point, or several times the static weight of the carbon pressing on any of the high points. As the spring is rotated, it is pressed against the carbon by centrifugal force. At 1558 RPM the deflection due to centrifugal force would amount to 0.03 inch, or, the spring would lose contact with the flange portion 82. At 2203 RPM, the spring deflection would be 0.060 inch. Thus, the spring could be designed so that it would not interfere with the rotation of the ring assembly and it would not wear by rubbing on the flange portion 82. An alternative type of springing would make use of small coil springs set in the ends of the ring segments.

Figure 8:
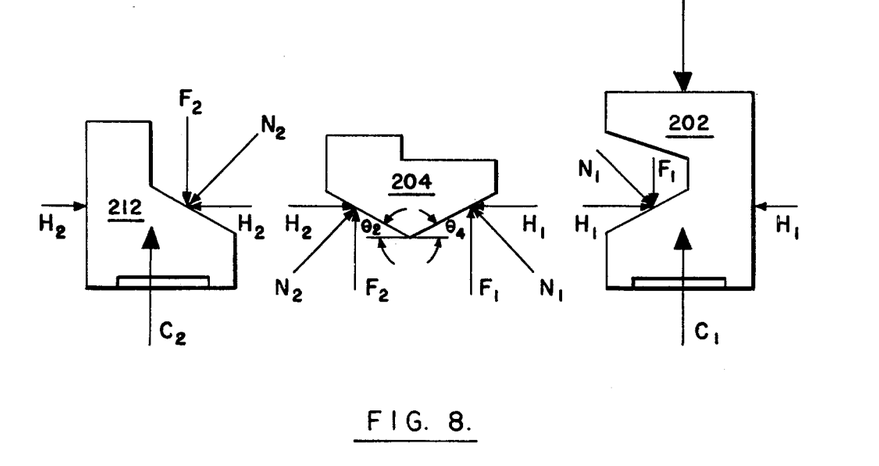
FIG. 8 is a diagrammatic force diagram showing the forces on elements of the seal of FIG. 7.

FIG. 8 shows the forces on a unit length of a compensating ring segment 212, the balancing ring 204 and a seal ring segment 202, assuming that friction at the surfaces where these rings make contact can be neglected. The forces $C_1$ and $C_2$ represent the centrifugal force on the seal ring segment and the compensating ring segment, respectively. The radial force component $F_2$ on the compensating ring segment must equal the centrifugal force $C_2$. The axial force component $H_2$ will depend on the angle $\theta_2$ of the cone on the compensating ring segment and the balancing ring. It will be noted that in the absence of friction, $H_2$ will be equal to $F_2$ times the tangent of $\theta_2$. Similarly $H_1$ will be equal to $F_1$ times the tangent of $\theta_1$ and, since $H_1$ must equal $H_2$ in the absence of friction, we have the relation:

$$F_1 \tan \theta_1 = F_2 \tan \theta_2 \quad (1).$$

With the ring assembly rotating at some speed other than that of the inner shaft, there are two rubbing surfaces tending to make the assembly rotate with the inner shaft 34 and one rubbing surface tending to make the assembly rotate with the outer shaft 32. To equalize these tendancies, the loadings on the transverse surfaces should equal the loading on the arcuate surface, that is:

$$2F_1 \tan \theta_1 = (C_1 - F_1) \quad (2).$$

If $F_1 \div C_1$ equals the fraction of $C_1$ that is compensated centrifugally and this is designated by $\lambda$ $$2\lambda \tan \theta_1 = 1 - \lambda \quad (3).$$

Thus, if half the centrifugal force is compensated, $\lambda = 0.5$ $$\tan \theta_1 = 0.5 \; ; \; \theta_1 = 26.565°.$$

If 0.60 of the centrifugal force is compensated, $$\tan \theta_1 = 0.3333 \cdots ; \; \theta_1 = 18.435°.$$

The angle $\theta_2$ will depend on $\theta_1$ and the ratio of $F_2$ to $F_1$, as stated in Equation (1). If $F_2 = \frac{1}{2} F_1$ then tan $\theta_2$ will be twice tan $\theta_1$. Therefore, if $\lambda$ is 0.5, tan $\theta_1 = 0.5$, tan $\theta_2 = 1.0$ and $\theta_2 = 45°$. If $\lambda = 0.6$, tan $\theta_1 = 0.3333$, tan $\theta_2 = 0.6667$ and $\theta_2 = 33.69°$. The above discussion neglects certain friction effects and also the difference in the radii of the arcuate surface and the transverse faces. These factors were neglected in the interest of simplifying the discussion. Rotation of the ring is caused not by drag alone, but by torque which is the product of drag and radius. In the above the radii at which $(C_1-F_1)$ and $H_1$ and $H_2$ act were considered to be the same when actually they differ. In actual design, the various radii would be taken into consideration.

The force diagrams in FIG. 8 neglect the friction forces which arise on the conical surfaces as a result of the normal forces $N_1$ and $N_2$. The direction of these friction forces would depend on the direction of the relative motion of the parts. In the absence of relative motion there would be no friction force. Furthermore, with normal machine vibration, restraint from friction is rapidly dissipated.

It will be apparent that the severity of the problem with counterrotating shafts can be met by modifying both the rubbing load and the rubbing speed. Modification of speed is the more important since the centrifugal loading on the seal ring varies with the square of the speed. Thus, a reduction in speed of 50% is equivalent to removing 75% of the rubbing load. The device depicted in FIG. 7 and described herein allows the rotational speed of the seal ring to establish itself at some value between the speeds of the counterrotating shafts. For most cases, considering rotation in one direction to be positive and that in the other direction to be negative, a rotational speed near the average of the two can have quite a low value. It will be apparent that the device of FIG. 7 is also useful where the shafts are corotating at different speeds.

THIRD EMBODIMENT

If still more accurate control of rubbing velocities is desired, the embodiment of FIG. 7 can be modified to provide a governing system to control the relative velocities between the inner and outer shafts and the seal assembly.

Figure 9:
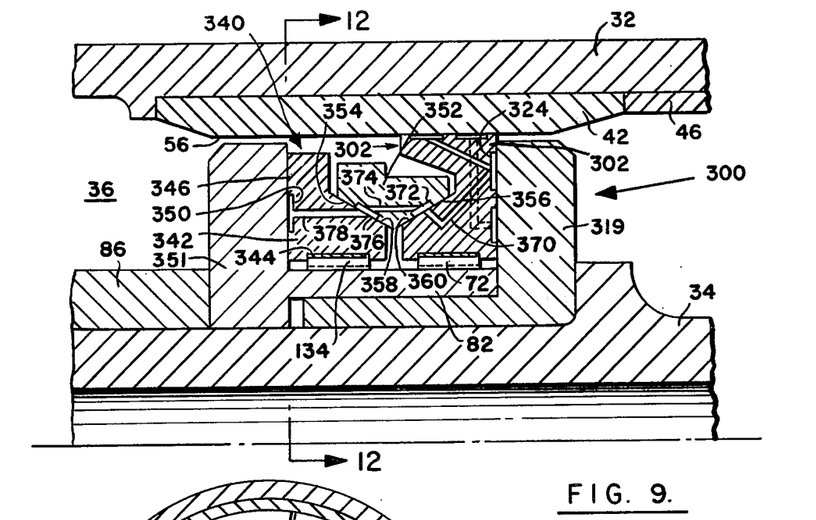
FIG. 9 is a vertical section, partially broken away, showing an alternative seal in accordance with the invention.

Referring now to FIG. 9, shafts 32 and 34 are counterrotating with the portion of shaft 32 shown rotating towards the viewer and shaft 34 rotating in the opposite direction. A seal 300 has a seal ring 302 with four segments 304 (FIG. 11) each having an outer peripheral face 306 adapted to bear against the inner surface 56 of shaft sleeve 42. Outer face 306 has a hydrodynamic pocket 308 with a passage 310 providing free communication between the pressure region 36 and pocket 308. Passage 310 is at the leading end of pocket 308 with respect to relative rotation with shaft 32. The direction of rotation of shaft 32 causes fluid in pocket 38 to be dragged away from passage 310 towards the closed end of the pocket where a relatively high pressure is produced. Outer face 306 also has a closed pocket 314.

Each segment 304 has a side face 318 which confronts mating ring 319 which is identical with mating ring 78 except for the elimination of openings 92. Face 318 has a hydrodynamic pocket 320 which is in free communication with pressure region 36 by virtue of a passage 322 in the leading end of pocket 320 with respect to the relative rotation with mating ring 319. Rotation of mating ring 319 causes fluid to be dragged in the direction away from passage 322 towards the closed end of pocket 320 where a relatively high pressure is produced. Face 318 also has a closed pocket 324 which is in communication with the trailing (high pressure) end of pocket 308 by virtue of a passage indicated at 326. Similarly, closed pocket 314 is in communication with the trailing (high pressure) end of hydrodynamic pocket 320 by virtue of a passage indicated at 328.

Each segment 304 has a perioheral recess 332 for the reception of spring 72 which is designed as discussed with respect to the embodiment of FIG. 7

Referring to FIG. 9, a compensating ring 340 has four segments 342 which are the same as balancing ring segments 212 except as noted hereafter. Each segment 342 has a peripheral groove 344 for the reception of spring 134 which is designed as discussed with respect to the embodiment of FIG. 7. Each segment 342 has a face 346 in which is found a closed pocket 350 confronting a flange 351 which is identical to flange 84 with the exception of the elimination of openings 128.

Figure 13:
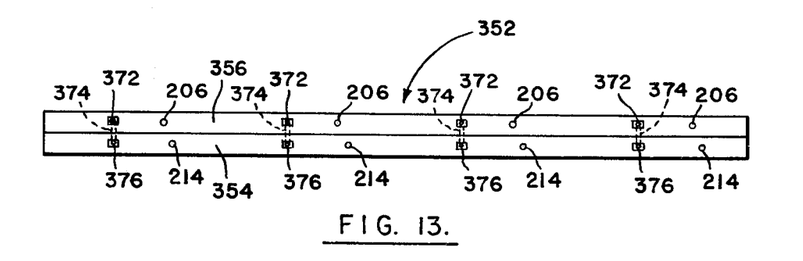
FIG. 13 is a development view of the outside of the balancing ring in the seal of FIG. 9.

A balancing ring 352 similar to balancing ring 206 has conical faces 354 and 356 which mate with faces 358 and 360 on segments 342 and 304, respectively. The balancing ring 352 is connected to compensating ring segments 342 and seal ring segments 304 for rotation therewith by pins 214 and 206 (FIG. 13) fixed in balancing ring 352 and engaged in slots in segments 342 and 304 respectively (not shown) in precisely the same fashion as the balancing ring 204 is connected to compensating ring segments 212 and seal ring segments 202 in the embodiment of FIG. 7. A passage 370 (FIG. 9) in each seal ring segment 304 is in communication with closed pocket 324 and a closed pocket 372 in balancing ring 352. Each pocket 372 in turn is connected by a passage 374 to a closed pocket 376 which in turn is connected by a passage 378 in the adjacent segment 342 to pocket 350.

The embodiment of FIG. 9 operates in a manner similar to the embodiment of FIG. 7 modified by the hydrodynamic effects which will now be discussed.

The direction of relative rotation is such that there is a pressure gradient in each of hydrodynamic pockets 308 and 320 with the pressure being greatest at the trailing ends of these pockets, with these pressures being communicated respectively to closed pockets 324 and 314. If with fixed counterrotating speeds for outer shaft 32 and inner shaft 34 the relative speed of each seal ring segment 304 with respect to outer shaft 32 should increase, the relative speed with respect to the inner shaft 34 will decrease. The pressure gradient in pocket 308 will increase in proportion to an increase in the relative speed between shaft 32 and segment 304. Therefore, the pressure at the adit of conduit 326 will increase and this pressure will be communicated to closed pocket 324 through channel 326. This increase in pressure will also be communicated to closed pocket 350 in compensating ring 340 through passages 370, pocket 372, passage 374, pocket 376, and channel 378. At the same time, the pressure gradient in hydrodynamic pocket 320 will decrease causing a decrease in pressure at the adit of passage 328 and in turn a decrease in pressure in closed pocket 314. This results in an increase in the contact force between the outer face 306 of each seal segment 304 with the inner surface 56 of outer shaft sleeve 42 and a decrease in the contact force of the side face 318 of each seal segment 304 on mating ring 319, as well as, a decrease in the contact force of the compensating ring 340 on flange 351. In this manner, the increase of the drag force of the outer shaft 32 and the reduction of the drag force by mating ring 319 on seal ring 302 as well as the reduction of the drag force on compensating ring 340 by flange 351 will reduce the relative speed between the seal ring 302 and outer shaft 32 and increase the relative velocity between both seal ring 302 and mating ring 319 and compensating ring 340 and flange 351.

While the design of the hydrodynamic and closed pockets will obviously vary considerably with the circumstances, in the average case where both the outer and inner shafts are counterrotating at relatively high speed, they will be designed so that the assembly of seal ring 302 with compensating ring 340 and balancing ring 352 will rotate relatively slowly or not at all. Should one of the counterrotating shafts be rotating at a much higher speed than the other shaft, the design may be such that wear is minimized by having the seal ring rotating in the same direction as the direction of the faster rotating shaft at such a speed as to equalize the wear between the seal ring and the two shafts.

It will be appreciated that the seal of FIG. 9 is also useful where the inner and outer shafts are rotating in the same direction. In such event, the seal is particularly useful where one shaft is rotating much faster than the other shaft, in which event, the pockets will be designed so that the seal ring will rotate at a speed intermediate the speed of the two shafts at which wear of the seal will be minimized.

It will be understood that the above-described embodiments are illustrative and are not intended to be limiting.

I claim:

1. A seal between a hollow outer shaft and an inner shaft concentric with the outer shaft having a seal ring having a plurality of segments extending around the inner shaft, an outer circumferential face confronting the inner surface of the outer shaft, a first side face exposed to a region of high pressure between the shafts and a second side face having a portion thereof confronting a mating ring secured to the inner shaft and a portion thereof exposed to a region of lower pressure, and means for urging the outer face of the seal ring into conact with the inner surface of the outer shaft, characterized in that:

a segmented compensating ring extends around the inner shaft and is spaced from the seal ring in the region of high pressure, a flange is secured to the inner shaft for limiting the axial movement of the compensating ring away from the seal ring, said seal ring and said compensating ring each have a conical face with the said conical faces facing toward each other;

a continuous balancing ring lies between the seal ring and the compensating ring and has a conical face mating with the conical face of the seal ring and a conical face mating with the conical face of the compensating ring, Whereby the centrifugal loading of the compensating ring urges the balancing ring towards the seal ring creating a radially inwardly force on the seal ring compensating for a portion of the centrifugal loading of the seal ring.

2. A seal in accordance with claim 1 having means for connecting the seal ring to the mating ring for rotation therewith and means for connecting the compensating ring to the flange for rotation therewith.

3. A seal ring in accordance with claim 1 having means for connecting the balancing ring to the seal ring and having means for connecting the balancing ring to the compensating ring.

4. A seal in accordance with claim 2 in which the means to urge the outer face of the seal ring into contact with the inner surface of the outer shaft comprises a wavy strip of spring metal having its inner surface in contact with a surface rotating with the inner shaft with the spring being pressed against the seal ring by centrifugal force and deflecting sufficiently to lose contact with said surface when the seal ring is rotating.

5. A seal in accordance with claim 3 in which the means to urge the outer face of the seal ring into contact with the inner surface of the outer shaft comprises a wavy strip of spring metal having its inner surface in contact with a surface rotating with the inner shaft with the spring being pressed against the seal ring by centrifugal force and deflecting sufficiently to lose contact with said surface when the seal ring is rotating.

6. A seal in accordance with claim 3 having means for urging the compensating ring into contact with the balancing ring.

7. A seal in accordance with claim 6 in which each of the means for urging the outer face of the seal ring into contact with the inner face of the outer shaft and each of the means for urging the compensating ring into contact with the balancing ring comprises a wavy strip of spring metal having its inner surface in contact with a supporting surface rotating with the inner shaft and which during the operation of the shafts is urged by centrifugal force in the direction towards the outer shaft sufficiently to lift it off said supporting surface.

8. A seal between a hollow outer shaft and an inner shaft concentric with the outer shaft and having a seal ring having a plurality of segments extending around the inner shaft, an outer circumferential face of each segment confronting the inner face of the outer shaft, a first side face of each segment exposed to a region of high pressure between the shafts and a second side face of each segment having a portion thereof confronting a mating ring secured to the inner shaft and a portion thereof exposed to a region of lower pressure, and means for urging the outer face of the seal ring into contact with the inner face of the outer shaft characterized in that:

a segmented compensating ring extends around the inner shaft and is spaced from the seal ring in the region of high pressure, a flange is secured to the inner shaft for limiting the axial movement of the compensating ring away from the seal ring, said seal ring and said compensating ring each have a conical face with the said conical faces facing toward each other, a continuous balancing ring lies between the seal ring and the compensating ring and has a conical face mating with the conical face of the seal ring and a conical face mating with the conical face of the compensating ring, a hydrodynamic pocket in the outer face of each segment of the seal ring with the leading end of the pocket with respect to the direction of rotation of the outer shaft in free communication with the high pressure region, a closed pocket in the outer face of each segment of the seal ring, a hydrodynamic pocket in the second side face of each segment of the seal ring with the leading end of the pocket with respect to the direction of rotation of the mating ring in free communication with the high pressure region, a closed pocket in the second side face of each segment of the seal ring, means for providing in each segment of the seal ring communication between each closed pocket in the second side face and a portion of the hydrodynamic pocket in the outer face spaced away from said leading end of the pocket, means for providing in each segment of the seal ring communication between the closed pocket in the outer face and a portion of the hydrodynamic pocket in the second side face spaced away from the leading end of the pocket, whereby the centrifugal loading of the compensating ring urges the balancing ring towards the seal ring creating a radially inwardly force on the seal ring compensating for a portion of the centrifugal loading of the seal ring, and whereby the contact force on the outer face of the seal ring and the contact force on the second face of the seal ring vary inversely with the relative speed between the seal ring and the mating ring and the outer shaft respectively in order to reduce the rubbing velocities.

9. The combination of claim 8 in which each segment of the compensating ring has a closed pocket confronting the flange and having means for providing communication between each said pocket in the compensating ring segments and a portion of the hydrodynamic pocket in the outer face of a seal ring segment spaced away from said leading end of the pocket.

10. A seal in accordance with claims 8 or 9 having means for connecting the balancing ring to the seal ring and for connecting the balancing ring to the compensating ring.

11. A seal in accordance with claims 8, 9 or 10 having means to urge the compensating ring into contact with the balancing ring.

12. A seal in accordance with claim 11 in which each of the means for urging the outer face of the seal ring into contact with the inner face of the outer shaft and each of the means for urging the compensating ring into contact with the balancing ring comprises a wavy strip of spring metal which when the seal ring rotates is urged by centrifugal force in the direction towards the outer shaft sufficiently to lift it off its supporting surface.

* * * * *